United States Patent
Witt-Nuesslein et al.

(10) Patent No.: US 6,482,876 B1
(45) Date of Patent: Nov. 19, 2002

(54) AGGLOMERATES FOR THE PRODUCTION OF AN AQUEOUS BINDER SYSTEM

(75) Inventors: Sandra Witt-Nuesslein, Langenfeld; Werner Haller, Erkrath; Bernhard Schoettmer, Monheim; Monika Boecker, Leichlingen; Wolfgang Seiter, Neuss; Ingo Hardacker, Hamminkein; Heinz-Peter Hoffmann, Monheim, all of (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/462,942

(22) PCT Filed: Jul. 15, 1998

(86) PCT No.: PCT/EP98/04397

§ 371 (c)(1), (2), (4) Date: Mar. 15, 2000

(87) PCT Pub. No.: WO99/03945

PCT Pub. Date: Jan. 28, 1999

(30) Foreign Application Priority Data

Jul. 17, 1997 (DE) .......................... 197 30 541
Feb. 5, 1998 (DE) .......................... 198 04 512

(51) Int. Cl.[7] .............................. C08L 1/02; C08L 1/08; C08L 1/28; C08L 3/02; C08L 3/58
(52) U.S. Cl. .............................. 524/35; 524/42; 524/43; 524/44; 524/45; 524/46; 524/47; 106/162.8; 106/162.81; 106/164.01; 536/84; 536/91; 536/94; 536/95; 536/96; 536/97; 536/98; 536/99; 536/100; 536/102; 536/106
(58) Field of Search .............................. 524/35, 42, 43, 524/44, 45, 46, 47; 106/162.8, 162.81, 164.01; 536/56, 84, 91, 94, 95, 96, 97, 98, 99, 100, 102, 106

(56) References Cited

U.S. PATENT DOCUMENTS 4,017,598 A * 4/1977 Ohno et al. .................. 424/35
5,087,649 A   2/1992 Wegner et al. ............... 524/30
5,258,429 A  11/1993 Kniewske et al. ............ 524/31

FOREIGN PATENT DOCUMENTS

| DE | 31 03 338 | 8/1982 |
| DE | 0 39 12 983 | 10/1990 |
| DE | 42 00 188 | 7/1992 |
| DE | 197 02 026 | 7/1997 |
| EP | 0 311 873 | 4/1989 |
| EP | 0 416 405 | 3/1991 |
| EP | 0 597 364 | 5/1994 |
| FR | 2 241 599 | 3/1975 |
| GB | 2 251 438 | 7/1992 |

OTHER PUBLICATIONS

Petrolite Corporation v. Watson, Comr. Pats. (DC DC) 113 USPQ 248, 1957.*

Austenal Laboratories, Incorporated v. Nobilium Processing Company of Chicago (DC NI11) 115 USPQ 44, 1957.*

Pharm. Sciences 2 (6) (1992) p. 445–462.

Ullmanns Encylopedia of Industrial Chemistry, vol. 82, pp. 7–1 to 7–37.

Pharm. Ind. 41, (1979) p. 459–464.

* cited by examiner

*Primary Examiner*—Peter Szekely
(74) *Attorney, Agent, or Firm*—Stephen D. Harper; Daniel S. Ortiz

(57) ABSTRACT

The invention relates to an agglomerate containing at least one of the following water-soluble or water-dispersible materials as a bonding base polymer: carboxylized and/or alkoxylized starch, cellulose ether and fully synthetic vinyl polymers and/or polyacrylates. The agglomerate is characterized in that it contains a blasting agent which produces a high swelling pressure, but, advantageously, does not gel. The agglomerate can have a regular geometric form or not. Its weight should be between 0.5 and 500 g. The agglomerate is used in particular in the production of lump-free paste.

26 Claims, 1 Drawing Sheet

1

AGGLOMERATES FOR THE PRODUCTION OF AN AQUEOUS BINDER SYSTEM

Figure 1:
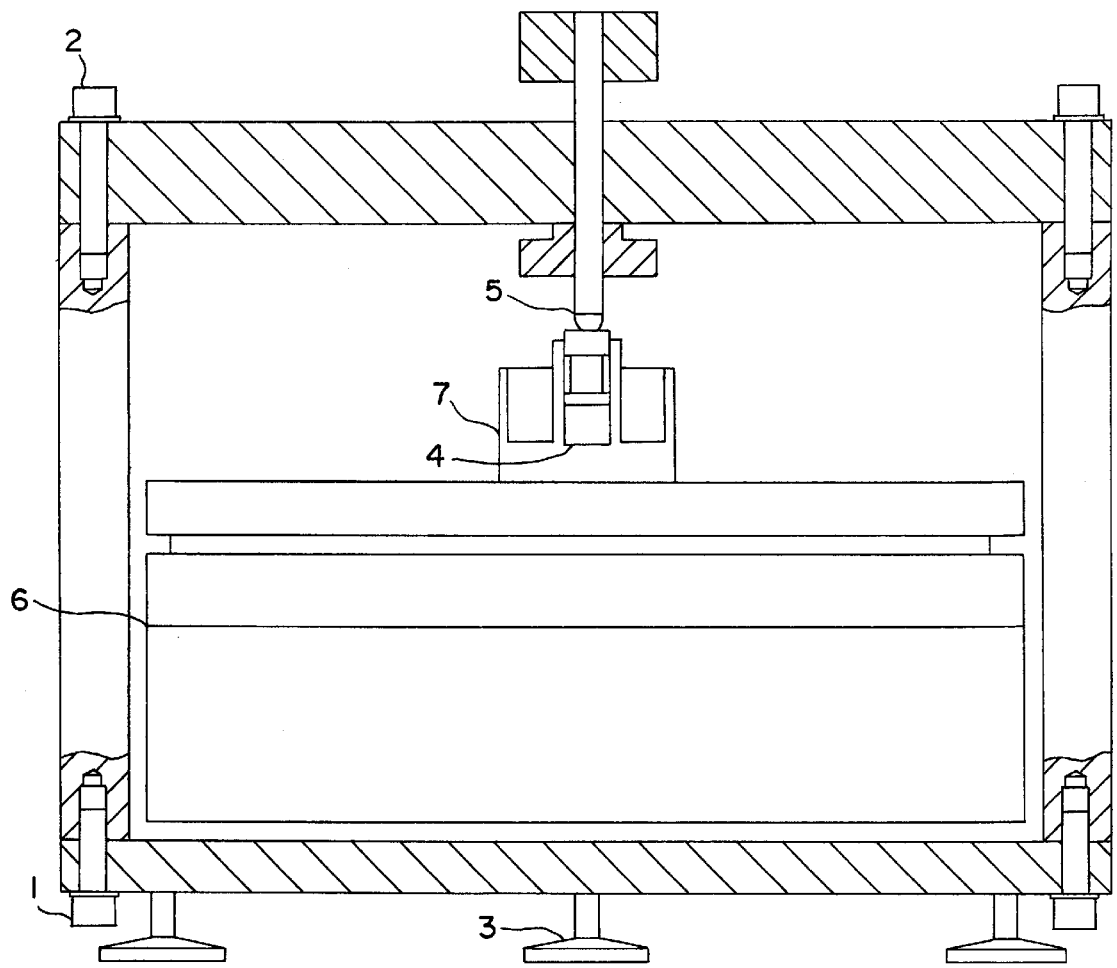

This application is filed under 35 U.S.C. 371 and based on PCT/EP98/04397, filed Jul. 15, 1998.

BACKGROUND OF THE INVENTION

1. Field of the Invention

This invention relates to agglomerates—in the form of shaped bodies or aggregates—of substances for the preparation of an aqueous binder system, to their production and to their use.

Agglomerates in the context of the present invention are understood to be more or less porous collections of powder-form materials which are sufficiently coherent for practical application. If the agglomerates are irregularly shaped particles, i.e. do not have any regular geometric shape, but instead uneven or jagged surfaces, they are referred to as aggregates. If the agglomerates have a regular shape with flat or rounded surfaces, they are referred to as shaped bodies. The agglomerates are intended to consist of materials for the preparation of aqueous binder systems. An aqueous binder system in the context of the invention is understood to be a solution or dispersion used for bonding, strengthening or sealing. Specific examples are pastes, dispersion adhesives, primers for mineral substrates, etc. To obtain ready-to-use binders such as these, the dry agglomerates need only be dissolved or dispersed in water.

2. Discussion of Related Art

Agglomerates of the type in question are known. Thus, DE 31 03 338 describes a dry paste mix on powder-form cellulose ethers. Quick-dissolving granules between 100 and 600 $\mu$m in size are produced from cellulose ethers with a particle size distribution of 90% <200 $\mu$m in the presence of added water in a granulator. Under the effect of the water added during granulation, the granules have a higher volume than before. Even after drying, the granules have a bulk density of only about 50% of the original powder mixture. This results in a higher consumption of packaging material which is undesirable. The granules can be formed in a press, for example to tablets 25 mm in diameter. These tablets are said to dissolve instantaneously after introduction into water and, after stirring just once for 5 seconds, form a ready-to-use paste after 8 minutes. The tablets contain cellulose ethers, glyoxal, phosphoric acid and ethoxylated fatty alcohols. They may also contain a polymer dispersion powder. The disadvantage of tablets with this composition is that the ready-to-use paste is not free from lumps which, on the outside, are gel-like but, on the inside, are still completely dry. These lumps dissolve very slowly even after vigorous stirring or after waiting for long periods.

This problem of lump formation is discussed in DE 42 00 188 and is solved by the presence in the tablet—in addition to the water-soluble dry polymer—of a product which reacts in the presence of water and releases a gas in the process. The product in question is preferably a dry acid component and a carbonate or bicarbonate. In addition, it is recommended to add other substances for disintegrating the tablets, for example starch, superabsorbers, silica and talcum. A superabsorber is described as a cellulose ether crosslinked in such a way that it is insoluble in water and is capable of absorbing around 50 times its weight of deionized water. The disadvantage of this solution is that all the substances used must have only a very low water content because otherwise premature gas generation occurs during storage of the adhesive tablets. In order to obtain the necessary disintegrating effect for the tablets, around 30 to 50% of the tablets consist of salts. This high electrolyte content leads to an up to 30% lower viscosity by comparison with electrolyte-free adhesive compositions which this considerably reduces the "mileage" of the paste.

Tablets of the type in question—with or without superabsorbers—have at least one of the following disadvantages:

production under rigorous dry conditions only, inadequate tablet strength, lack of stability in storage through sensitivity to moisture and small lumps which only disappear after 30 minutes.

In DE 197 02 026, these disadvantages are avoided by producing the shaped bodies under moderate conditions so that even the edges of the shaped body are porous. To this end, the powder-form materials for preparing the paste are formed with 5 to 40% by weight of water into blanks which are strengthened by gentle heating, more particularly by exposure to microwaves. The disadvantage of this solution lies in the expense of using microwaves.

Against the background of this prior art, the problem addressed by the present invention was to avoid the disadvantages mentioned above and, in particular, to provide an agglomerate of substances for the preparation of an aqueous binder system which, even after storage for several months, would dissolve in water without any lumps after gentle stirring for the usual time of at most about 15 minutes and would produce substantially the same viscosity as the corresponding powder without any disintegrators.

DESCRIPTION OF THE INVENTION

The solution provided by the invention is defined in the claims and is essentially characterized in that the agglomerate of substances for the preparation of an aqueous binder system contains at least one hydrophilic disintegrator which is insoluble in water and which generates a swelling pressure. The agglomerates according to the invention contain 99.5 to 50% by weight, more particularly 97 to 70% by weight and above all 95 to 85% by weight of substances for the preparation of an aqueous binder system and 0.5 to 50% by weight, preferably 3 to 30% by weight and above all 5 to 15% by weight of disintegrator, based on the sum of disintegrator and substances for the preparation of an aqueous binder system.

A disintegrator in the context of the present invention is understood to be a substance or mixture of substances which provides for the rapid disintegration of the agglomerate, more particularly the tablet, in aqueous medium and thus contributes to the rapid and complete development of the effect of the active substances. The use of disintegrators of water-soluble or water-insoluble substances, which swell on contact with water and in doing so generate a swelling pressure and undergo an increase in volume, is known in principle. In pharmaceutical technology in particular, disintegrators of the type in question are used as disintegration accelerators for medicaments in tablet form. The disintegration mechanisms of tablets which contain a water-insoluble tablet disintegrator that generates a swelling pressure on contact with water are described, for example, by A. M. Guyot-Hermann in the book entitled "Tablet Disintegration and Disintegrating Agents", S.T.P. Pharma Sciences 2(6), pages 445 to 462, 1992.

Hydrophilic solids are suitable for the disintegrators according to the invention. Hydrophilic means rapidly and completely wetted by water. The wettability of the disintegrator can be usefully improved by addition of and, more particularly, by surface treatment with surfactants in quantities of 0.1 to 10 g and preferably 0.5 to 3 g surfactant per 100 g disintegrator. Nonionic surfactants are preferred to anionic and cationic surfactants.

The disintegrator must generate a high swelling pressure. Thus, the maximum swelling pressure of the disintegrator must be above the maximum swelling pressure of each individual adhesive component and should amount to at least $10^5$ $Nm^{-2}$ (1 bar) and preferably to at least $1.4 \cdot 10^5$ $Nm^{-2}$ (1.4 bar) at a concentration of 20%, as measured by the method described in the Examples. Above all, it is important that the swelling pressure of the disintegrator 1 minute after the addition of water should be greater, preferably by a factor of 1.3, than the swelling pressure of the adhesive components. Advantageously, not only the swelling pressure, but also the swelling volume (=amount of water absorbed) should be high because, in that case, the increase in volume is also high. The disintegrators should advantageously absorb at least twice their weight and, more particularly, 5 times their weight of water. In many cases, it is sufficient if they absorb around 10 times their weight of water.

The disintegrator is insoluble in water, i.e. has a solubility below 1 g and preferably below 0.01 g, based on 100 ml of water at 20° C., as measured 1 minute after the addition of water with stirring and preferably after an even longer period up to saturation point. Solubility is normally determined gravimetrically as the residue of the solution after the undissolved fraction has been separated, for example by filtration or centrifuging. If the disintegrator is a polymer, its insolubility may also be determined through the viscosity. It should increase by at most 10%, but preferably not at all, in one minute, preferably at saturation level. One example of polymeric disintegrators are retarded cellulose derivatives. Retarded cellulose derivatives are reversibly crosslinked cellulose derivatives which are insoluble in their crosslinked state, but soluble in their uncrosslinked state. The crosslinking is eliminated by water with a pH value of at least 8.

The disintegrator preferably does not gel in the test described in the specification.

A fibrous internal and/or external structure of the disintegrator is advantageous for a rapid effect. "Fibrous" in the context of the invention is understood to be a form in which at least one dimension is at least twice as large as the two substantially equal other dimensions. Fibers between 0.03 and 1.5 mm in length and preferably between 0.1 and 1.0 mm in length are generally present. The fibers preferably consist of cellulose and cellulose derivatives. However, other readily wettable materials, for example glass, are also suitable. However, non-fibrous forms may also be used.

The disintegrator is above all a natural or partly synthetic polysaccharide or derivative thereof, more particularly based on cellulose. However, starch is also a suitable base. However, fully synthetic disintegrators based on crosslinked polyvinyl pyrrolidones (PVP) may also be used. Short-cut fibers and microcrystalline polymers are particularly preferred. Collagens, amyloses, polyamides and, above all, cellulose, for example in the form of softwood flour, may be used.

In principle, the disintegrator may be selected from a number of known disintegrators. Examples of the celluloses and modified celluloses are Avicell PH 101, 102 and 200 (FMC), Arbocel Bww 40 (Rettenmaier), Elcema (Degussa AG), Lattice NT 200 (manufacturer unknown). Examples of starch products are the highly crosslinked hydroxypropyl starch Prejel VA 70-S-AGGL (Scholten) and the sodium carboxymethyl starches CMC UAP 500 and Primojel. The crosslinked sodium carboxymethyl cellulose Ac-Di-Sol (FMC) and the crosslinked polyvinyl pyrrolidone derivatives Kollidon CL (BASF) and Polyplasdone XL (GAF) are also suitable.

The disintegrator is preferably compacted. Compaction is understood to be a process by which starting products are pressed together (compressed) into larger units with or without a binder. The starting materials for the disintegrator should preferably be present in a mixture of different dimensions. Mixtures of cellulose and cellulose derivatives with a fiber length of ca 30 to 150 $\mu$m on the one hand and, for example, from 500 to 1500 $\mu$m on the other hand have been successfully used. The surfactants and other additives such as, for example, polyols, such as sorbitol, and water-soluble polymers, such as polyvinyl alcohol and polyvinyl pyrrlidone, are preferable added before compacting. The compacted disintegrator has a bulk density of 200 to 700 g/l and, more particularly, 350 to 450 g/l and a particle size of preferable 0.1 to 3 mm and more, preferably, 0.2 to 2 mm. Preferably the compacted disintegrator comprises less than 5% by weight of the disintegrator, of particles less than 0.2 mm in diameter.

The substances for the preparation of an aqueous binder system are 50 to 99% by weight of water-soluble or water-dispersible, inorganic or organic natural or partly synthetic polymers which are non-tacky at room temperature in their dry state (basic polymers) and 0 to 50% by weight of a fully synthetic polymer (adhesiveness promoter)—percentages by weight based on the sum of disintegrator and substances for the preparation of an aqueous binder system.

Besides waterglass, the basic polymer may be at least one of the following water-soluble or water-dispersible natural or partly synthetic polymers, particularly if a paste is to be prepared:

a) starch and/or starch derivatives and b) cellulose derivatives, more particularly cellulose ethers.

The starch should be soluble or swellable in water. Modified starch is of particular interest, the modification being achieved by physical action or by gentle chemical action. Specific examples are partly degraded starch and pregelatinized starch.

The starch derivatives should also be soluble or swellable in water. Starch esters or starch ethers, above all carboxylated and alkoxylated starches, are of particular interest. Suitable carboxylated and/or alkoxylated starches are any correspondingly modified natural starch types of potatoes, corn, wheat, rice, milo, tapioca and the like, derivatives based on potatoes and/or corn starch being preferred. Suitable starch derivatives have a degree of carboxylation of 0.1 to 2.0 (DS) or a degree of alkoxylation of 0.05 to 1.5 (MS). The starch derivatives may also be crosslinked. Suitable crosslinking agents are difunctional compounds. Crosslinking agents such as these are known (see, for example, EP 0 311 873 B1, page 3, line 49 to page 4, line 5).

Suitable cellulose ethers are, in particular, the following types: carboxymethyl cellulose (CMC), carboxymethyl methyl cellulose (CMMC), ethyl cellulose (EC), hydroxybutyl cellulose (HBC), hydroxybutyl methyl cellulose (HBMC), hydroxyethyl cellulose (HEC), hydroxyethyl carboxymethyl cellulose (HECMC), hydroxyethyl ethyl cellulose (HEEC), hydroxypropyl cellulose (HPC), hydroxypropyl carboxymethyl cellulose (HPCMC), hydroxypropyl methyl cellulose (HPMC), hydroxyethyl methyl cellulose (HEMC), methyl hydroxyethyl cellulose (MHEC), methyl hydroxyethyl propyl cellulose (MHEPC), methyl cellulose (MC) and propyl cellulose (PC), carboxymethyl cellulose, methyl cellulose, methyl hydroxyethyl cellulose and methyl hydroxypropyl cellulose and the alkali metal salts of CMC and the lightly ethoxylated MC being preferred.

The cellulose derivatives may be lightly crosslinked so that they are soluble at a pH above 8 and dissolve in water with delay. Crosslinking can be achieved by additions of glyoxal. In order to guarantee a pH value of at least 8 in the solution after dissolution, the basic component should be present in excess over the acid component. The pH value is preferably in the range from 8 to 9.5. It can be of advantage to use several basic polymers together.

The water-soluble or water-dispersible fully synthetic polymers polyvinyl pyrrolidone, polyacrylamide, polyvinyl alcohol and polyacrylic acid salts may also be at least partly used as adhesiveness promoters. Polyacrylates containing 1 to 8 carbon atoms in the alcohol component and vinyl polymers, more particularly polyvinyl acetate, are preferred.

Other suitable adhesiveness promoters are redispersible dispersion powders of fully synthetic polymers, for example the following homopolymers and copolymers: vinyl ester, styrene, acrylate and vinyl chloride polymers. Vinyl ester polymers suitable as the basic polymer are vinyl acetate homopolymers, copolymers of vinyl acetate with ethylene and/or vinyl chloride and/or other vinyl esters, such as vinyl laurate, versatic acid vinyl esters, vinyl pivalate and/or esters of maleic acid/fumaric acid; or homopolymers of vinyl esters of saturated $C_{3-8}$ alkyl carboxylic acids or copolymers thereof with ethylene, vinyl chloride and/or other vinyl esters. The (meth)acrylate and/or styrene (co)polymers are derived from polymers of styrene and/or esters of acrylic acid and/or methacrylic acid (referred to herein as (meth) acrylate) with linear, branched or cyclic aliphatic alcohols containing 1 to 20 carbon atoms. Other styrene (co)polymers are styrene/butadiene copolymers. Vinyl chloride/ethylene copolymers are suitable as vinyl chloride polymers.

Vinyl acetate homopolymers, vinyl acetate/ethylene copolymers or copolymers of vinyl esters of saturated $C_{3-8}$ alkyl carboxylic acids and ethylene with an ethylene content of 1 to 40% by weight of ethylene and 0 to 40% by weight of other vinyl esters from the group of vinyl esters of saturated $C_{3-8}$ alkyl carboxylic acids and/or vinyl chloride; styrene acrylates, such as styrene/butyl acrylate or styrene/ethylhexyl acrylate with a styrene content of 1 to 70% by weight are preferably used. These redispersible polymers are normally produced by spray drying of polymer dispersions in spray drying towers. It can be of advantage to use several adhesiveness promoters together.

The basic polymers may be used on their own or in combination with the adhesiveness promoters. Cellulose ethers and the above-mentioned starch derivatives in particular are suitable as sole binders. The cellulose derivatives and the starch derivatives to which the redispersible polymers may be added as adhesiveness promoters are suitable for a combination of two binders.

Up to 70% by weight of the fully synthetic polymers are used as basic polymer for adhesives for textile and ceramic coverings and for primers. Accordingly, the substances for the preparation of an aqueous binder system preferably have the following composition: 30 to 100% by weight of water-soluble or water-dispersible, inorganic or organic, natural or semisynthetic polymers which are non-tacky at room temperature (20° C.) in their dry state and 0 to 70% by weight of fully synthetic polymers—percentages by weight based on the total quantity of substances (polymers) for the preparation of an aqueous binder system.

In addition to these two key components (disintegrator and substances for the preparation of an aqueous binder system), the agglomerates may also contain auxiliaries in order to provide the binders with certain properties commensurate with the application envisaged, for example preservatives, wetting agents, release agents, pigments, stabilizers, etc. Quantitatively an important auxiliary are the fillers. Fillers are substances which are mainly added to increase volume or weight. In addition, they are also capable of improving technical performance, for example reducing tackiness where this is important in any particular application. Typical fillers are carbonates (for example calcium carbonate), silicates (for example talcum, clay, mica), silica, sulfates (calcium and barium), aluminium hydroxide and glass fibers and beads. Fillers such as these may be present in the agglomerate in a quantity of up to 30% by weight and preferably in a quantity of 1 to 10% by weight, based on the sum of the substances for preparing an aqueous binder system and the disintegrator. However, the fillers may also be mixed with the agglomerate.

However, the agglomerate should contain less than 10% by weight and preferably less than 1% by weight of salts which form gases under storage or in-use conditions. If a foamy binder system is required, this gas-generating system should not be present in the agglomerates, but instead in a mixture therewith.

The substances mentioned above for the preparation of an aqueous binder system are generally solid and should be processed as a powder or agglomerates to larger agglomerates. The particle size of the starting materials should be at least 0.01 mm and is preferably in the range from 0.2 to 3 mm and more preferably in the range from 0.5 to 1.5 mm.

The aggregates obtained are made up of coarse particles and, after sieving, should preferably have the following particle size distribution:

<0.4 mm max. 3% by weight
>0.4 mm and <1.0 mm max. 27% by weight
>1.0 mm and <1.6 mm max. 35% by weight and
>1.6 mm and <3.0 mm max. 35% by weight However, aggregates outside this particle size distribution, for example flakes with a surface area of up to 1 $cm^2$ and a height of up to 3 mm, are also possible.

The shaped bodies obtained may have virtually any geometric shape. Thus, they may be spherical, cylindrical or parallelepipedic or may assume any other three dimensional geometric form, for example tablets, rods, bars and spheres. Shaped bodies with a geometric shape which can internally accommodate at least one hypothetical cube with an edge length of 2.5 mm are preferred. The geometric shape of the shaped bodies is determined by the application envisaged for them. It should facilitate handling in storage and in use. Thus, the weight of the shaped bodies should allow the production of typical portions of water-based adhesives without any need for weighing. The shaped bodies weigh between 0.5 and 500 g and more particularly between 1 and 100 g. If the shaped body contains grooves, for example in the manner of a chocolate bar, the individual portions should have a weight of at least 1 gram.

The agglomerates according to the invention may be produced by known methods of agglomeration (see, for example, Ullmann's Encyclopedia of Industrial Chemisty, 5th Edition, Vol. B2, pages 7-1 to 7-37). Such methods are generally concerned with the production of coarse-particle agglomerates by the action of pressure, temperature and/or solvents on fine-particle materials, i.e. on powder-form or agglomerated mixtures. Where agglomeration is carried out by pressing (briquetting), the fine-particle mixture is mechanically compressed (compacted) with or without the addition of a binder. Briquetting binders which reduce the pressure to be applied by virtue of their plasticizing effect are preferably used for the agglomerates according to the invention. The quantity in which the briquetting binder is used will depend above all on the granulometry of the powder. Suitable binders are, for example, solid polyethylene glycols in a quantity of up to 10% by weight and preferably in a quantity of up to 5% by weight, based on the mixture to be briquetted. Of the various presses which may be used, roller presses above all and punch presses with a closed or open die and ring-roll presses are important. The agglomerates are preferably produced by water-free roller compacting of the powder-form original material. Besides agglomeration by application of pressure, agglomeration by wetting with a liquid (granulation) is of considerable importance. Water is preferably used as the granulation liquid. The wetted powder is also preferably heated. Processes such as these for the production of adhesive granules using water and heat, i.e. in the absence of the disintegrators according to the invention, are known. Thus, EP 311 873 describes the drying of an adhesive mixture containing 30 to 80% of water in a thin layer on belts at temperatures of 80 to 200° C. DE 39 12 983 describes the spray drying of an aqueous mixture of the adhesive ingredients. DE 197 02 026 describes a process for sintering the powder-form constituents of the adhesive in the presence of 5 to 40% by weight of water.

The agglomerates according to the invention rapidly form a lump-free aqueous solution or dispersion on contact with water. This lump-free aqueous solution or dispersion is preferably a paste, i.e. an adhesive in the form of a water-based swollen product which, even at relatively low solids concentrations, forms a highly viscous, non-stringing mass. These pastes are particularly suitable for hanging wallpaper and other wall coverings. However, other water-based adhesives can also be made in this way. Providing their composition is appropriate, the shaped bodies may also be used for the production of lump-free primers for mineral substrates, such as plaster, screed or concrete on walls, ceilings and floors. The surface thus stabilized is then generally coated, for example, with paint, with a surfacing compound or with an adhesive. Water-based adhesives for—above all—textile or ceramic coverings for floors, walls and ceilings can also readily be produced without any lumps from the agglomerates according to the invention.

The paste is preferably prepared as follows:
a) The agglomerates are added with stirring to the water.
b) Stirring is optionally continued until the shaped bodies have dissolved.

A lump-free paste is obtained in this way, in other words the paste does not contain any dry constituents of the agglomerate.

Compared with a paste prepared directly from the powder-form materials, the paste produced in accordance with the invention shows hardly any change in its performance-relevant properties, such as viscosity, wet adhesive strength and dry adhesive strength.

Other advantages of the invention include no dust emission during preparation of the paste and no separation of the paste ingredients in the pack.

The invention is described in more detail in the following:

I. Test Methods
1. Determination of Swelling Pressure

The rate at which tablets disintegrate on introduction into water is critically determined by the swelling pressure which the tablet disintegrator generates on taking up water. To this end, the swelling pressure was determined in accordance with the Article by List and Muazzan in Pharm. Ind. 41 (1979), pages 459–464. For this purpose, a test mixture consisting of 20% by weight of the tablet disintegrator to be tested, 1% by weight of aluminium stearate, 79% by weight of calcium dihydrogen phosphate.$2H_2O$ was vigorously mixed and packed in containers. The batch size was 10 g. To produce test tablets, 0.50 g of the mixture was introduced into a press and subjected to a pressure of 23 kN. The press used was a commercially available tablet press of the type used for making tablets for infrared spectroscopy (manufacturer: Perkin Elmer, press and pressure transducer, diameter of the press 13.5 mm). In order to determine the swelling pressure, the tablet was then placed in the cylinder of the measuring apparatus shown in FIG. 1 and fixed to an initial pressure of 1000 g in the apparatus by means of the punch. After taring, about 5 g of water was added and the maximum weight reading reached was read off from the balance. The swelling pressure was calculated from the force generated during swelling based on the surface area of the punch. The punch had a surface area of 1.43 $cm^2$. The balance showed a weight of 1800 g, in other words a swelling pressure of 1.23 bar was developed.

The test apparatus for determining the swelling pressure is schematically illustrated in FIG. 1. It consists essentially of a balance 6 accommodated in a housing with removable side walls and a removable cover (Satorius LC 1200 S). By means of the adjustable feet 3, the housing can be adjusted into an exact horizontal position on the supporting surface. The side walls (partly transparent) and the cover can be fixed to the base plate by the cylindrical screws 1 and 2. Disposed on the platform of the balance is the tube 7 which contains the cylinder 4 accommodating the test tablet in its center. Resting on the test tablet is a punch of which the initial pressure applied to the tablet can be adjusted by the screwthreaded rod 5.

2. Viscosity was determined as follows: Brookfield (RVT, spindle 5, 20 r.p.m.) at 20° C.

3. Gelation test

The disintegrator does not gel if its passes the following test:

1 Gram of the powder-form disintegrator to be tested is placed in the form of a circular cone in the middle of a Petri dish (diameter 60 mm). Using a pipette, distilled water (5 ml) is then introduced into the Petri dish around the cone and the cone is examined to determine whether the water has completely penetrated the test material. If a barrier layer is formed during the test, preventing the complete penetration of water through the sample, i.e. if the sample remains partly dry on the inside, it gels and does not meet the requirements of the invention.

II. Production and Characterization of the Agglomerates

1. Formulations for Disintegrators (in % by Weight)

1)
- 7% methyl hydroxyethyl/propyl cellulose (retarded),
- 20% China clay,
- 3% cellulose fibers (bleached, 1000 μm fiber length),
- 69% cellulose fibers (unbleached, 120 μm fiber length) and
- 1% nonionic wetting agent.

2)
- 7% methyl hydroxyethyl/propyl cellulose (retarded),
- 20% China clay
- 3% cellulose fibers (bleached, 1000 μm fiber length), 69% cellulose fibers (bleached, 120 μm fiber length),
1% nonionic wetting agent.
3)
7% methyl hydroxyethyl/propyl cellulose (retarded),
3% cellulose fibers (bleached, 1000 μm fiber length),
89% cellulose fibers (unbleached, 120 μm fiber length) and
1% nonionic wetting agent.
4)
7% methyl hydroxyethyl/propyl cellulose (retarded),
3% cellulose fibers (bleached 1000 μm fiber length),
89% cellulose fibers (bleached, 120 μm fiber length) and
1% nonionic wetting agent.
5)
7% methyl hydroxyethyl/propyl cellulose (retarded),
3% cellulose fibers (bleached 1000 μm fiber length),
89% cellulose fibers (bleached, 30 μm fiber length) and
1% nonionic wetting agent.
6)
100% methyl hydroxyethyl/propyl cellulose (retarded).
7)
100% cellulose fibers (120 μm fiber length).

2. Formulations for Tabletting a Paste (in % by Weight)
1)
45% methyl cellulose,
10% filler (Al silicate),
35% polyvinyl acetate redispersion powder (homopolymer)
5% cellulose fiber compactate (disintegrator) and
5% Karion (polysaccharide).
2)
45% methyl cellulose,
10% filler (Al silicate),
32.5% polyvinyl acetate redispersion powder (homopolymer),
5% cellulose fiber compactate (disintegrator),
5% Karion (polysaccharide) and
5% polyvinyl alcohol.
3)
45% methyl cellulose,
10% filler (Al silicate),
35% polyvinyl acetate redispersion powder (homopolymer),
5% cellulose fiber compactate (disintegrator) and
5% polyvinyl pyrrolidone.
4)
45% methyl cellulose,
10% filler (Al silicate),
35% polyvinyl acetate redispersion powder (homopolymer),
5% cellulose fiber compactate (disintegrator) and
5% polypyrrolidone.
5)
90% carboxymethyl starch,
10% cellulose fiber compactate.
6 to 9)formulations as formulation 1 with CMS, HPS, CMC or mixtures thereof instead of methyl cellulose.

3. Production of the Disintegrator Compactates and Mixing thereof with Paste Raw Materials The raw materials of the above formulations are first homogeneously mixed for about 20 minutes in a Lödige mixer (plowshare mixer, 100 to 200 r.p.m.). The powder mixture is then delivered to a roller compactor where the material is compacted under a pressure of 40 to 90 bar. The material thus compacted is then added to the required paste mixtures (see above), again in a Lödige mixer. The mixing time is again about 20 minutes. The products thus produced are then tabletted.

The roller compactor is a product of Alexanderwerk AG, Remscheid. It comprises a stirrer with a screw-like stirring element, a screw feed system with two feed screws, a roller press with a roller diameter of 150 mm in a bale length of 75 mm, two RFG 100 N precision regulators and an electrical control system.

4. Production and characterization of the adhesive tablets 200 g of paste powder based on the above formulations, for example ca. 50% methyl cellulose and ca. 50% of a polyvinyl acetate redispersion powder, were homogeneously mixed with 2–30% by weight of the cellulose-based disintegrator according to the invention and the resulting mixture was tabletted in a commercially available tablet press under a maximum pressure of 10 kN/cm$^2$ preferably not higher than 5 kN/cm$^2$. The tablets thus obtained were stable and, prowding the recommended procedure was followed (directions for using poviders) dissolved in tap water at room temperature in 3 minutes without forming any lumps.

5. Production and Characterization of a Paste Prepared from the Adhesive Tablet

In order to determine their usefulness, tablets having the composition shown in the following Table were mixed while stirring with water at room temperature in a ratio by weight of 1:32. The viscosity of the paste mixture was determined after 2 minutes and 30 minutes.

TABLE

| | | Disintegrator | | Viscosity [Pas] | |
|---|---|---|---|---|---|
| No. | Carboxymethyl starch % by weight | Known[1) % by weight | Invention % by weight | After 2 mins. | After 30 mins. |
| 1 | 100 (powder) | — | — | 5 | 10 |
| 2 | 90 | — | 10 | 6 | 10 |
| 3 | 90 | 10 | — | 3.6 | 5.9 |

[1)]Ratio by weight of $Na_2CO_3$:$NaHCO_3$:citric acid = 0.6:6.4:4.0

Accordingly, a paste solution was formed from the tablet containing the disintegrator according to the invention (No. 2) and, only 2 minutes after its preparation, was comparable in its viscosity to a paste solution prepared from the powder-form binder (No. 1). A known tablet (No. 3) containing a disintegrator consisting of an acid component and bicarbonate produced a paste solution having an approximately 40% lower viscosity so that it was considerably less economical to use.

2. Production and Characterization of an Adhesive Compactate

90% of a paste powder based on ca. 50% methyl cellulose and ca. 50% of a polyvinyl acetate redispersion powder were homogeneously mixed with 5% of cellulose-based disintegrator and 5% of polyethylene glycol 5000 and the resulting mixture was roller-compacted without drying at room temperature. The plates obtained were broken up. The fines (<400 μm) were removed by sieving. The aggregate could readily be stirred into water without forming any lumps. The final viscosity of the paste prepared from the aggregate, 9000 mPas after 30 mins., corresponded to the specification of the original. At 500 g/l, the bulk density corresponded to that of the original material. The compactate dissolves smoothly even after storage for more than 6 months.

What is claimed is:

1. An agglomerate comprising:
   a) 50 to 99.5 percent by weight of solid, water soluble or water dispersible substances for the preparation of an aqueous binder system; and
   (b) 0 5 to 50 percent by weight of at least one solid, water insoluble, swellable, hydrophillic disintegrator flaving a fibrous internal or external structures. The percent by weight, based on the weight of said disintegrator and said substances for the preparation of said aqueous binder system, wherein said disintegrator is capable of producing a swelling pressure of more then $10^5$ $Nm^{-2}$.

2. The agglomerate of claim 1 comprising 70 to 97 percent by weight of said substances for the preparation of an aqueous binder system.

3. The agglomerate of claim 2 comprising 85 to 95 percent by weight of said substances for the preparation of an aqueous binder system.

4. The agglomerate of claim 1 comprising 3 to 30 percent by weight of said disintegrator.

5. The agglomerate of claim 4 comprising 5 to 15 percent by weight of said disintegrator.

6. The agglomerate of claim 1 wherein said disintegrator is capable of producing a swelling pressure of more than $1.4 \times 10^5$ $Nm^{-2}$.

7. The agglomerate of claim 1 wherein said disintegrator has a solubility in water of less than 1 g/100 ml at 20° C. measured as the saturation limit.

8. The agglomerate of claim 7 wherein said disintegrator has a solubility in water of less than 0.01 g/100 ml at 20° C. measured as the saturation limit.

9. The agglomerate of claim 1 wherein said disintegrator comprises a mixture of a first disintegrator having a fiber length of from 30 to 150 $\mu$m and a second disintegrator having a fiber length of 50° $\mu$m to 150° $\mu$m.

10. The agglomerate of claim 1 wherein said disintegrator comprises short-cut fibers.

11. The agglomerate of claim 1 wherein said disintegrator comprises less than 10 percent by weight, based on the disintegrator as a whole, of fine particles smaller than 0.2 mm in diameter.

12. The agglomerate of claim 1 wherein said disintegrator comprises less than 5 percent by weight, based on the disintegrator as a whole, of fine particles smaller than 0.2 mm in diameter.

13. The agglomerate of claim 1 wherein said disintegrator comprises a member selected from the group consisting of natural polysaccharide, synthetic polysaccharide, crosslinked hydroxypropyl starch, sodium carboxymethyl starch and mixtures thereof.

14. The agglomerate of claim 13 wherein said disintegrator comprises a member selected from the group consisting of cellulose, crosslinked carboxy methyl cellulose and mixtures thereof.

15. The agglomerate of claim 1 wherein said disintegrator does not gel in water.

16. The agglomerate of claim 1 further comprising less than 10 percent by weight of salts which generate gas under in-use and storage conditions.

17. The agglomerate of claim 16 comprising less than 1 percent by weight of salts which generate gas under in-use and storage conditions.

18. The agglomerate of claim 1 wherein said substances for the preparation of an aqueous binder system comprise:
   a) 30 to 100 percent by weight of water-soluble or water-dispersible inorganic or organic, natural or semi-synthetic polymers which are non-tacky at room temperature in the dry state; and
   b) 0 to 70 percent by weight of fully synthetic, water soluble or water dispersible polymers,
based on the weight of substances for the preparation of an aqueous binder system.

19. The agglomerates of claim 18 wherein said substances for the preparation of an aqueous binder system comprises solid, water soluble or water dispersible compositions selected for the group consisting of waterglass, starch, carboxylated starch, alkoxylated starch, crosslinked starch, degraded starch, pregelatinized starch, carboxylated and alkoxylated starch, cellulose ethers, cross-linked cellulose ethers soluble at a pH above 8, and mixtures thereof.

20. The agglomerates of claim 18 wherein said substances for the preparation of an aqueous binder system comprise a member selected for group consisting of vinyl polymers, polyacrylates, redispersible polyvinyl acetates, and mixtures thereof, as adhesive promoters.

21. The agglomerates of claim 1 further comprising up to 30 percent by weight of fillers, based on the weight of the substances for preparing an aqueous binder system and the disintegrator.

22. The agglomerates of claim 21 comprising 1 to 10 percent by weight of fillers, based on the weight of the substances for preparing an aqueous binder system and the disintegrator.

23. A process for the production of the agglomerates of claim 1 comprising: agglomerating a powder-form or agglomerated mixture of the substances for preparing an aqueous binder system and the disintegrator, by the action of pressure, temperature, solvents or a combination thereof.

24. The process of claim 23 comprising applying a pressure of at most 10 $kN/cm^2$ to said powder-form or agglomerated mixture of the substances for preparing an aqueous binder system and the disintegrator.

25. The process of claim 24 comprising applying a pressure of at most 5 $kN/cm^2$ to said powder-form or agglomerated mixture of the substances for preparing an aqueous binder system and the disintegrator.

26. A wall covering paste comprising said agglomerate of claim 1.

* * * * *

UNITED STATES PATENT AND TRADEMARK OFFICE
CERTIFICATE OF CORRECTION

PATENT NO.   : 6,482,876 B1  
DATED        : November 19, 2002  
INVENTOR(S)  : Witt-Nuesslein et al.

It is certified that error appears in the above-identified patent and that said Letters Patent is hereby corrected as shown below:

<u>Title page,</u>
Item [75], Inventors, delete "Hamminkein", and insert therefor -- Hamminkeln --.

<u>Column 11,</u>
Line 8, delete "0 5", and insert therefor -- 0.5 --.
Line 9, delete "hydrophillic" and insert therefor -- hydrophilic --.
Line 9, delete "flaving" and insert therefor -- having --.
Line 10, delete "structures. The", and insert therefor -- structure the --.
Line 37, delete "50°", and insert therefor -- 500 --.
Line 37, delete "150°", and insert therefor -- 1500 --.

Signed and Sealed this

Twenty-fourth Day of June, 2003

JAMES E. ROGAN
*Director of the United States Patent and Trademark Office*